(12) United States Patent
Buer

(10) Patent No.: US 9,690,721 B2
(45) Date of Patent: Jun. 27, 2017

(54) SYSTEM AND METHOD OF SHARING MEMORY BY ARBITRATING THROUGH AN INTERNAL DATA BUS

(71) Applicant: Broadcom Corporation, Irvine, CA (US)

(72) Inventor: Mark Buer, Gilbert, AZ (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/609,046

(22) Filed: Jan. 29, 2015

(65) Prior Publication Data

US 2015/0205735 A1 Jul. 23, 2015

Related U.S. Application Data

(63) Continuation of application No. 10/899,808, filed on Jul. 27, 2004, now Pat. No. 8,949,548.

(60) Provisional application No. 60/502,374, filed on Sep. 12, 2003.

(51) Int. Cl.
*G06F 13/00* (2006.01)
*G06F 13/16* (2006.01)

(52) U.S. Cl.
CPC .......... *G06F 13/1663* (2013.01); *G06F 13/00* (2013.01); *G06F 13/16* (2013.01); *G06F 2213/0038* (2013.01); *Y02B 60/1228* (2013.01)

(58) Field of Classification Search
None
See application file for complete search history.

(56) References Cited

U.S. PATENT DOCUMENTS

| | | |
|---|---|---|
| 3,949,378 A | 4/1976 | Crabb et al. |
| 6,052,751 A | 4/2000 | Runaldue et al. |
| 6,101,605 A | 8/2000 | Buer |
| 6,128,658 A | 10/2000 | McLean |
| 6,182,183 B1 | 1/2001 | Wingard et al. |
| 6,401,164 B1 | 6/2002 | Bartoli et al. |
| 6,651,149 B1 | 11/2003 | Iwasaki |
| 6,748,563 B1 | 6/2004 | LeBlanc et al. |

(Continued)

OTHER PUBLICATIONS

Maxim Integrated Products, Inc., "Using Nonvolatile Static RAMs", Mar. 29, 2001, http://www.maximintegrated.com/en/app-notes/index.mvp/id/540.

(Continued)

*Primary Examiner* — Midys Rojas
(74) *Attorney, Agent, or Firm* — Sterne, Kessler, Goldstein & Fox PLLC

(57) ABSTRACT

One or more methods and systems of sharing an external memory between functional modules of an integrated circuit chip are presented. The invention provides a system and method of reducing the amount of off-chip memory utilized by one or more integrated circuit chips. In one embodiment, a method for sharing an off-chip memory among one or more on-chip functional modules comprises arbitrating the communication of data between one or more on-chip functional modules and the off-chip memory. In one embodiment, the arbitration is facilitated by using an internal data bus that is controlled by a bus arbiter control unit. In one embodiment, a system for sharing an off-chip memory between functional modules of an integrated circuit comprises a security processing module, a media access controller module, a data interface, and a data bus.

19 Claims, 2 Drawing Sheets

(56) References Cited

U.S. PATENT DOCUMENTS

| | | |
|---|---|---|
| 6,779,054 B2 | 8/2004 | Campbell et al. |
| 6,816,940 B2 | 11/2004 | Brooks et al. |
| 6,983,366 B1 | 1/2006 | Huynh et al. |
| 7,003,713 B2 | 2/2006 | Rodgers |
| 7,117,352 B1 | 10/2006 | Giles et al. |
| 7,149,901 B2 | 12/2006 | Herbert et al. |
| 7,296,148 B2 | 11/2007 | Sakaguchi |
| 7,325,121 B2 | 1/2008 | Buer |
| 8,949,548 B2 | 2/2015 | Buer |
| 2002/0129271 A1 | 9/2002 | Stanaway, Jr. et al. |

OTHER PUBLICATIONS

"Trusted Computing Platform Alliance (TCPA) Main Specification", Trusted Computing Group, Version 1.1b, Feb. 22, 2002, pp. 1, 317 and 320.

Bishop, Matt, "Computer Security Art and Science", Addison-Wesley, 2003, pp. 3-7, 309-310, 355.

Microsoft Computer Dictionary, Fifth Edition, Microsoft Press, 2002, pp. 133, 192, 281, 365, and 396.

Mitchell, Bradley, "The MAC Address, and Introduction to MAC Addressing", http://compnetworking.about.com/od/networkprotocolsip/l/aa062202a.htm, retrieved Nov. 9, 2008, pp. 1-2.

Darringer et al., "Early analysis tools for system-on-a-chip design", IBM J. Res. & Dev., Nov. 2002, vol. 46, No. 6, pp. 691-707.

"Specification for the: Wishbone System-on-Chip (SoC) Interconnection Architecture for Portable IP Cores", OpenCores Organization, Revision B.3, Sep. 7, 2002, pp. 1-28, and 93-136.

IEEE Std 802.3, 2000 Edition, "Part 3: Carrier sense multiple access with collision detection (CSMA/CD) access method and physical layer specifications", IEEE Computer Society, Mar. 8, 2002, pp. 38-39.

SYSTEM AND METHOD OF SHARING MEMORY BY ARBITRATING THROUGH AN INTERNAL DATA BUS

RELATED APPLICATIONS/INCORPORATION BY REFERENCE

This application is a continuation of U.S. patent application Ser. No. 10/899,808, filed on Jul. 27, 2004, which will issue as U.S. Pat. No. 8,949,548 on Feb. 3, 2015, which claims benefit of U.S. Provisional Patent Application No. 60/502,374, filed on Sep. 12, 2003, now expired, all of which are incorporated herein by reference in its entirety.

This application is also related to U.S. patent application Ser. No. 10/899,815, entitled "SYSTEM AND METHOD OF UTILIZING OFF-CHIP MEMORY", filed on Jul. 27, 2004, the complete subject matter of which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Speed and performance issues necessitate the use of memory in order to adequately implement the critical processes and functions provided by an integrated circuit chip. Often, an integrated circuit chip will interface with its own dedicated memory. The memory may comprise an external flash memory.

For example, media access controller chips often require the use of flash memory in order to effectively process packets that it transmits or receives. The media access controller may, for example, require the flash memory to store program code, MAC addresses, and other information or descriptors. Furthermore, the flash memory may act as a buffer to continuously transmit and receive packets at high speeds with other devices.

Similarly, off-chip memory may be required for processing performed by integrated circuit chips employing a trusted platform module (TPM). The trusted platform module (TPM) was developed by Trusted Computing Platform Alliance (TCPA) in order to provide a more secure computing platform for computing devices such as computers, PDAs, and wireless devices. An external memory, such as a flash memory, may be used to store secure data used by the TPM.

Unfortunately, the use of such multiple off-chip memories (e.g., flash memories) in a computing device often translates to additional costs. There are incremental costs associated with furnishing additional integrated circuit memory chips. Furthermore, this translates to increased space requirements, necessitating the use of additional board space in order to manufacture a computing device. Also, incorporating additional memory chips on a printed circuit board relates to increased power consumption and power dissipation. The increased power consumption may have a significant impact on battery life while the increased power dissipation may affect the stable operating environment of the computing device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention provide for a method and system of sharing an external memory between functional modules of an integrated circuit chip. The system and method reduces the amount of off-chip memory utilized by one or more integrated circuit chips by sharing one or more external memories.

In one embodiment, a method for sharing an off-chip memory among one or more on-chip functional modules comprises arbitrating data communication between one or more on-chip functional modules and the off-chip memory by way of an on-chip internal data bus.

In one embodiment, a method for sharing a memory between a security processing module and a media access controller module comprises arbitrating data flow from the security processing module and the media access controller module to the memory by way of an internal data bus.

In one embodiment, a system for sharing an off-chip memory among one or more functional modules of an integrated circuit comprises a first functional module, a second functional module, a data interface, and an internal data bus.

These and other advantages, aspects, and novel features of the present invention, as well as details of illustrated embodiments, thereof, will be more fully understood from the following description and drawings.

DETAILED DESCRIPTION OF THE INVENTION

Aspects of the invention provide a system and method of reducing the amount of off-chip memory required by consolidating the functions of the one or more integrated circuit chips into a single integrated circuit chip. A single integrated circuit chip is implemented that incorporates the functions of the one or more integrated circuit chips. In one embodiment, the functions may be represented as functional modules within the single integrated circuit chip wherein the number of functional modules correspond to the number of integrated circuit chips prior to the consolidation. Aspects of the present invention allow the functional modules of the integrated circuit chip to access and share a common external memory. In one embodiment, the common external memory comprises a flash memory.

In one embodiment of the present invention, the functions provided by two integrated circuit chips, in which each chip utilizes its own dedicated memory, are implemented on a single integrated circuit chip. The functions provided by each integrated circuit prior to the consolidation are represented by their corresponding function modules. In this embodiment, the two functional modules incorporated within the single integrated circuit chip may now be configured to share the use of a single off-chip memory. The off-chip memory is shared between the two functional modules by way of arbitration accomplished using an internal data bus. In one embodiment, the arbitration is facilitated using a bus arbiter control unit. As a consequence, the number of memory chips used is reduced from two chips to one chip.

In one embodiment, the two functional modules comprise a trusted computing or trusted platform module (TPM) and a media access controller module (MACM). The trusted platform module implements one or more processes that provide various security functions. The security functions may comprise user authentication functions as well as secure communication functions. In one embodiment, the trusted platform module (TPM) complies with one or more versions (e.g., 1.0, 1.1, 1.1b, 1.2) of the Trusted Computing Platform Alliance (TCPA) specification for Trusted Platform Modules (TPM). The one or more specifications may be obtained at the following website: www.trustedcomputinggroup.org. The one or more specifications are incorporated herein by reference in their entirety. In one embodiment, the MACM complies with IEEE 802.3 specifications. In one embodiment, the TPM and MACM functional modules may be consolidated onto a single integrated circuit chip. In one embodiment, the single integrated circuit chip may be situated on a network interface card (NIC) or on a LAN on motherboard (LOM) of a computing device. The computing device may comprise a computer, a PDA, or a wireless telecommunications device.

Figure 1:
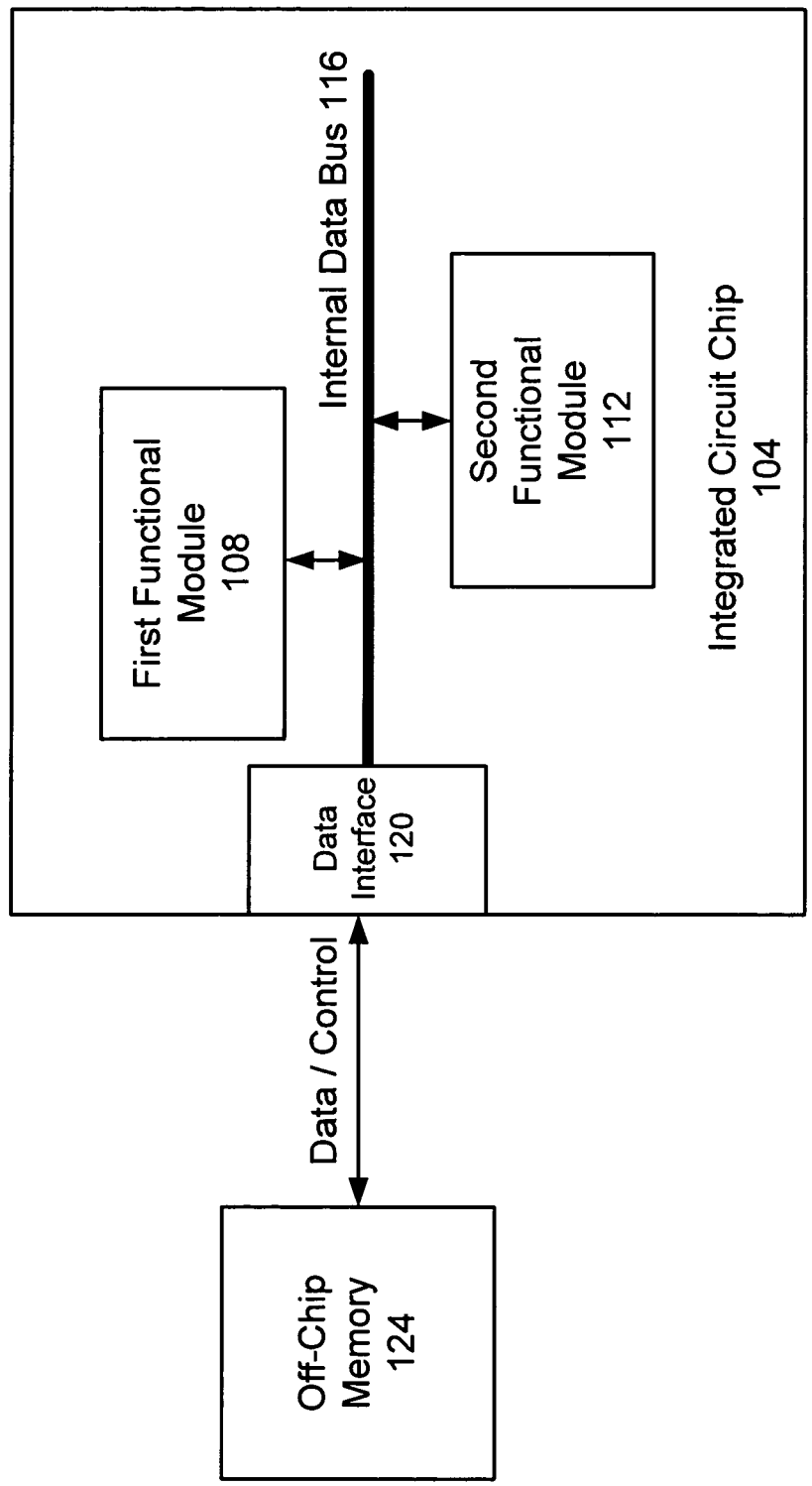
FIG. 1 is a block diagram of two functional modules in an integrated circuit that utilizes a common off-chip memory in accordance with an embodiment of the invention.

FIG. 1 is a block diagram of two functional modules in an integrated circuit 104 that utilizes a common off-chip memory 124 in accordance with an embodiment of the invention. A functional module may comprise any circuitry capable of providing a set of features and/or functions. As illustrated, the integrated circuit 104 comprises a first functional module 108, a second functional module 112, an internal data bus 116, and a data interface 120. The internal data bus 116 is used to arbitrate data communication between either the first functional module 108 or the second functional module 112 and an off-chip (external) memory 124. In one embodiment, the off-chip memory 124 comprises a non-volatile memory. In another embodiment, the off-chip memory 124 comprises a flash memory. The data interface 120 facilitates communication from the internal data bus 116 to the off-chip memory 124. The internal data bus 116 may comprise a 32-bit data bus. The data may be clocked in and out of the data bus 116 at a rate determined by the clock rate of a processor utilized by the computing device that contains the integrated circuit 104. It is contemplated that the first functional module 108 comprises function(s) that may be implemented from within a first integrated circuit chip while the second functional module comprises function(s) that may be implemented from within a second integrated circuit chip. Hence, it is contemplated that the first and the second integrated circuit chips may each have previously utilized its own corresponding off-chip memory, necessitating the use of two off-chip memories. Again, by incorporating the two functional modules into a single integrated circuit, a single off-chip memory 124 may be shared between two functional modules. As a consequence, the number of components has been reduced.

It is contemplated that one or more functional modules may be able to communicate with the off-chip memory 124 by way of arbitration that occurs using the internal data bus 116. The communication may comprise data reads and writes to the off-chip memory 124 using read and/or write control signals. The read/write control signals facilitate the storage of data into the off-chip memory 124. Each of the first and second functional modules may contain a control processor or CPU. Each control processor may facilitate the arbitration of its functional module over the internal data bus 116.

In one embodiment, the data is written into and read out of the off-chip memory 124 using data blocks in which each block is capable of being identified by way of an identifier. Use of an identifier provides quick identification of the data block required by a functional module of an integrated circuit chip. In one embodiment, one or more identifiers are generated by programming one or more bits of a memory, such as a one time programmable memory, implemented within a functional module of the integrated circuit chip 104. The one or more programmed bits may be further processed by a logic circuitry to generate the identifier.

Although not shown in FIG. 1, a bus arbiter control unit may provide arbitration management (e.g., data steering) of one or more functional modules connected to the internal data bus 116. In summary, one or more functional modules may share the use of an off-chip memory 124 by way of communicating through the internal data bus 116. The internal data bus 116 communicates to the off-chip memory 124 through the data interface 120.

Figure 2:
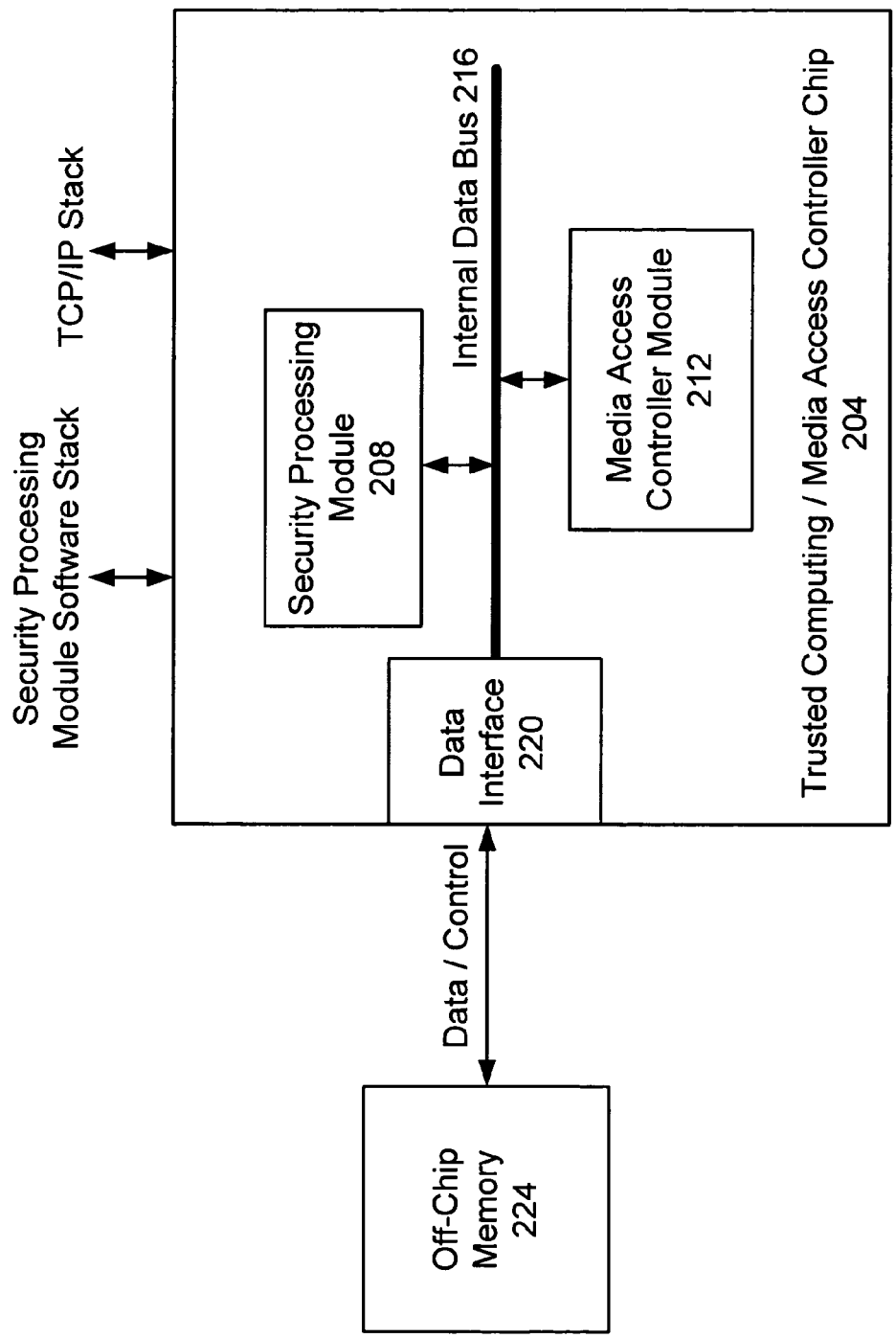
FIG. 2 is a block diagram of a security processing module and a media access controller module in an integrated circuit that utilizes a common off-chip memory in accordance with an embodiment of the invention.

FIG. 2 is a block diagram of a security processing module 208 and a media access controller module 212 in an integrated circuit chip 204 that utilizes a common off-chip memory 224, in accordance with an embodiment of the invention. FIG. 2 is a specific embodiment of FIG. 1. In the embodiment shown, the system is implemented using a single integrated circuit chip 204, described as a trusted computing/media access controller chip (TCMAC) 204. The TCMAC 204 may, for example, be situated on a network interface card seated on a motherboard of a computing device. In one embodiment, the network interface card communicates with the motherboard by way of a PCI interface. In another example, the TCMAC 204 may be situated on a LAN (local area network) on motherboard configuration (LOM). As illustrated, the trusted computing/media access controller chip (TCMAC) 204 comprises a security processing module 208, a media access controller module 212, an internal data bus 216, and a data interface 220. Referencing FIG. 1, in this embodiment, the first functional module is now represented as the security processing module 208 while the second functional module is now represented as the media access controller module 212. The security processing module 208 arbitrates with the media access controller module 212 for access to the internal data bus 216. Although not shown, the internal data bus 216 may provide arbitration for additional modules and/or devices (other than the security processing module 208 and media access controller module 212) within the trusted computing/media access controller chip (TCMAC) 204. The internal data bus 216 may utilize one or more protocols that facilitates arbitration between the one or more devices communicatively coupled to the internal data bus 216, in order to access the off-chip (external) memory. The arbitration may be facilitated using control processor(s) located within the security processing module 208 and/or the media access controller module 212. The data interface 220 facilitates communication between the TCMAC 204 and an off-chip memory 224. In one embodiment, the off-chip memory 204 comprises a non-volatile memory. In another embodiment, the off-chip memory 204 comprises a flash memory. The off-chip memory 224 stores data that is used by the security processing module 208 and/or the media access controller module 212. The TCMAC 204 may communicate with one or more applications by way of a security processing module software stack. The security processing module 208 may utilize one or more software drivers provided by the security processing module software stack. In addition, the TCMAC 204 may interface with other devices by way of TCP/IP software stack. The media access controller module 212 may utilize the TCP/IP software stack in order to effectively communicate with other computing devices. These software stacks may comprise a number of protocols and/or drivers used for interfacing and communicating between a host computing device and another computing device. The one or more applications may be used by any computing or telecommunication device. Although not shown in FIG. 2, a bus arbiter control unit may provide arbitration management (e.g., data steering) of the security processing module 208 and the media access controller module 212 connected to the internal data bus 216.

In one embodiment, the security processing module 208 comprises a trusted computing or trusted platform module (TPM) providing security functions that comply with and/or conform to the Trusted Computing Platform Alliance (TCPA) specification for Trusted Platform Modules (TPM).

In one embodiment, the media access controller module 212 comprises an Ethernet controller module providing support for one or more IEEE 802.3 standards. For example, the Ethernet controller module complies or conforms to the following IEEE 802.3 standards: IEEE 802.3ab, IEEE 802.3ac, IEEE 802.3ad, IEEE 802.3u, IEEE 802.3x, and IEEE 802.3z.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for sharing an external memory among one or more on-chip functional modules, the method comprising:
arbitrating communication between a plurality of on-chip functional modules, each on-chip functional module from among the plurality of on-chip functional modules including a CPU coupled to the external memory via an on-chip internal data bus and an on-chip interface;
facilitating, by the CPU of an on-chip functional module from among the plurality of on-chip functional modules that is selected in the arbitrating, writing one or more identifiable data blocks to the external memory and reading the one or more identifiable data blocks from the external memory; and
reading data from the on-chip internal data bus of the on-chip functional module and writing data to the on-chip internal data bus of the on-chip functional module at a rate determined by a clock rate of a processor external to a chip having the plurality of on-chip functional modules.

2. The method of claim 1, further comprising:
performing a computing task by the CPU residing on each on-chip functional module from among the plurality of on-chip functional modules.

3. The method of claim 2, further comprising:
facilitating arbitrating communication between the plurality of on-chip functional modules and the external memory by the CPU residing on each on-chip functional module from among the plurality of on-chip functional modules.

4. The method of claim 1, further comprising:
performing user authentication by at least one on-chip functional module from among the plurality of on-chip functional modules.

5. The method of claim 1, further comprising:
performing a security function by at least one on-chip functional module from among the plurality of on-chip functional modules.

6. The method of claim 1, further comprising:
performing, by at least one on-chip functional module from among the plurality of on-chip functional modules, a media access controlling functionality.

7. The method of claim 6, further comprising:
communicating, by the at least one on-chip functional module, with a remote computing device using TCP/IP protocol.

8. The method of claim 6, wherein the performing comprises:
performing an Ethernet controlling module functionality.

9. The method of claim 8, wherein the performing the Ethernet controlling module functionality comprises:
providing, by the at least one on-chip functional module, support for one or more IEEE 802.3standards.

10. The method of claim 1, wherein each on-chip functional module from among the plurality of on-chip functional modules further includes a memory, and further comprising:
programming one or more bits of the memory of each on-chip functional module to generate identifiers for the one or more identifiable data blocks.

11. An integrated circuit chip, comprising:
a plurality of functional modules, each functional module from among the plurality of functional modules including:
a CPU;
an internal data bus;
a data interface configured to communicatively couple to an external memory, wherein the external memory is configured to store one or more identifiable data blocks and to be shared among the plurality of functional modules; and
a module configured to perform user authentication, secure communication, and media access control,
wherein the plurality of functional modules is configured to access the external memory by way of arbitration using their respective internal data buses,
wherein the CPU of a functional module from among the plurality of functional modules that is selected in the arbitration is configured to facilitate writing one or more identifiable data blocks to the external memory and reading the one or more identifiable data blocks from the external memory, and
wherein the plurality of functional modules is configured to read data from their respective internal data buses and to write data to their respective internal data buses at a rate determined by a clock rate of a processor external to a chip having the plurality functional modules.

12. The integrated circuit chip of claim 11, further comprising:
a bus arbiter control unit.

13. The integrated circuit chip of claim 11, wherein the external memory comprises:
a non-volatile memory.

14. The integrated circuit chip of claim 11, wherein the external memory comprises:
a flash memory.

15. The integrated circuit chip of claim 11, wherein the internal data bus of each functional module from among the plurality of functional modules comprises:
a 32-bit data bus.

16. The integrated circuit chip of claim 11, wherein the plurality of functional modules is configured to collectively operate as part of a network interface card.

17. The integrated circuit chip of claim 11, wherein each functional module from among the plurality of functional modules further comprises:
a module configured to perform trusted computing.

18. The integrated circuit chip of claim 11, wherein at least one functional module from among the plurality of functional modules is configured to perform a media access controlling functionality, wherein the at least one functional module comprises:
an Ethernet controller module.

19. The integrated circuit chip of claim 11, wherein each functional module from among the plurality of functional modules further includes a memory, and
wherein the CPU of each functional module is further configured to program one or more bits of the memory of each functional module to generate identifiers for the one or more identifiable data blocks.

* * * * *

UNITED STATES PATENT AND TRADEMARK OFFICE
CERTIFICATE OF CORRECTION

PATENT NO. : 9,690,721 B2  
APPLICATION NO. : 14/609046  
DATED : June 27, 2017  
INVENTOR(S) : Mark Buer Page 1 of 1

It is certified that error appears in the above-identified patent and that said Letters Patent is hereby corrected as shown below:

In the Claims

In Column 6, Line 30, replace "802.3standards" with --802.3 standards--.

Signed and Sealed this  
Twentieth Day of March, 2018

Andrei Iancu  
*Director of the United States Patent and Trademark Office*